Sept. 28, 1926.
W. ASTLE ET AL
1,601,586
FLUID PRESSURE BRAKE CONTROL VALVE
Filed Nov. 10, 1925    4 Sheets-Sheet 1
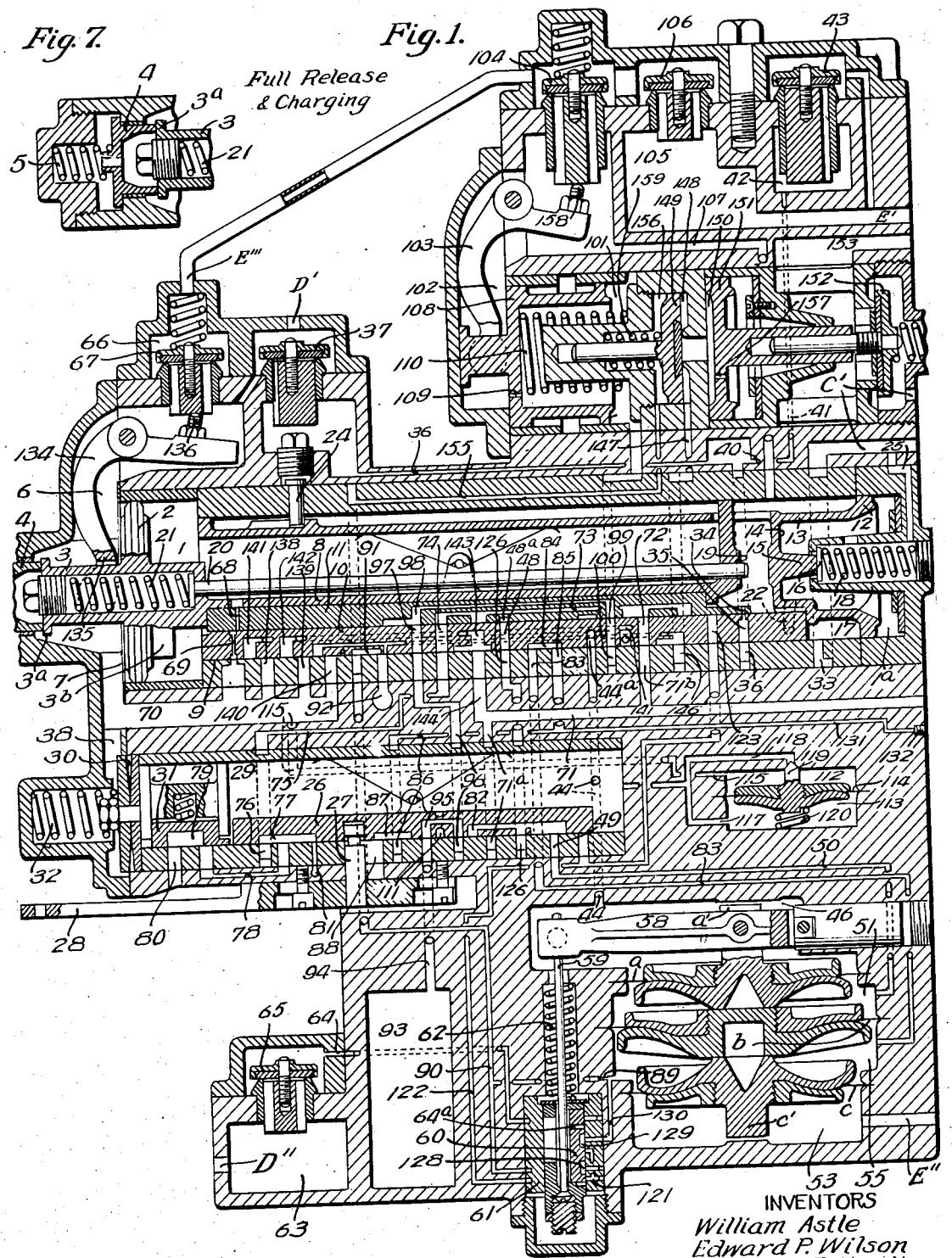
INVENTORS
William Astle
Edward P. Wilson
Maurice E. Hamilton
Spencer G. Neal
BY
ATTORNEYS

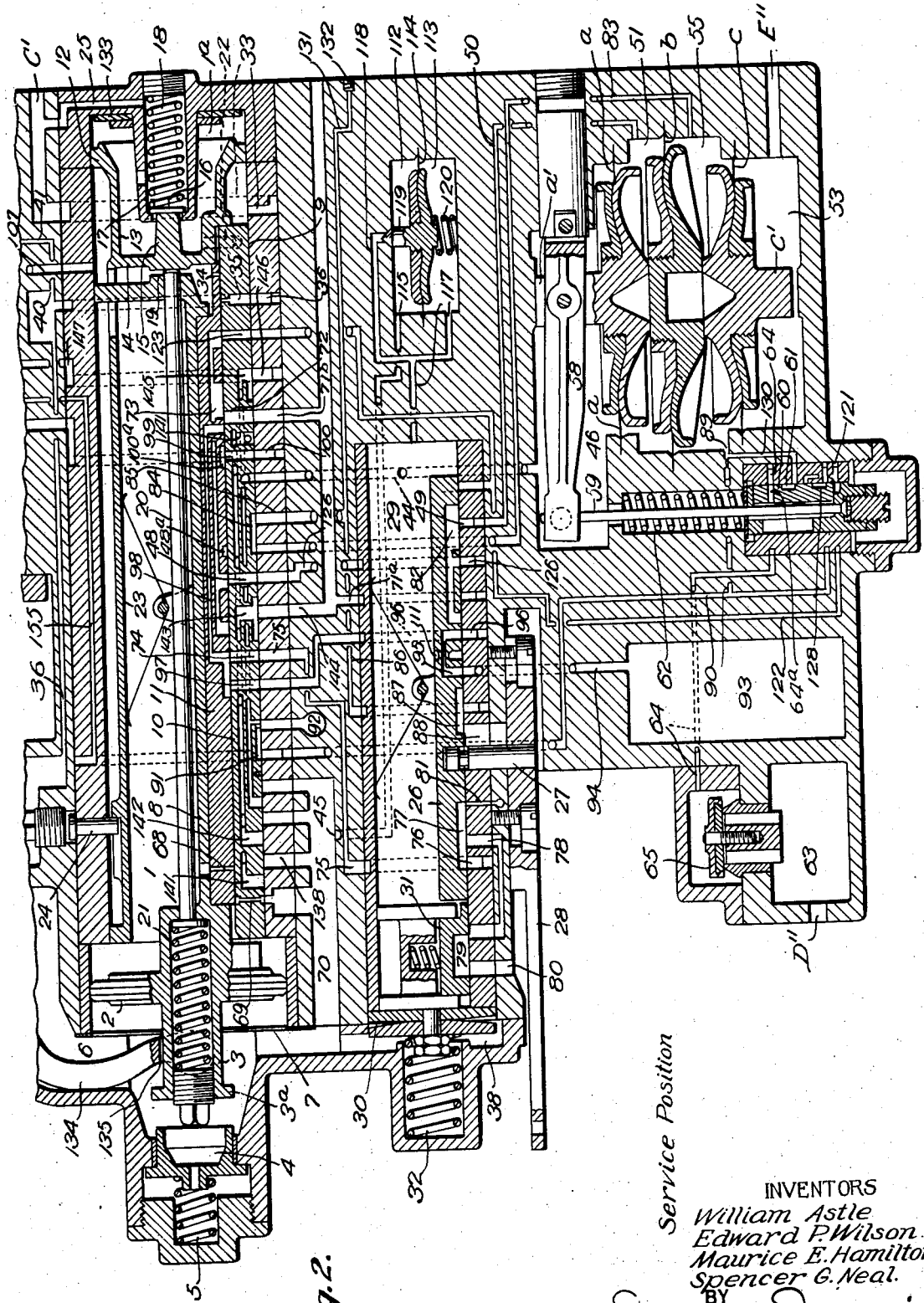

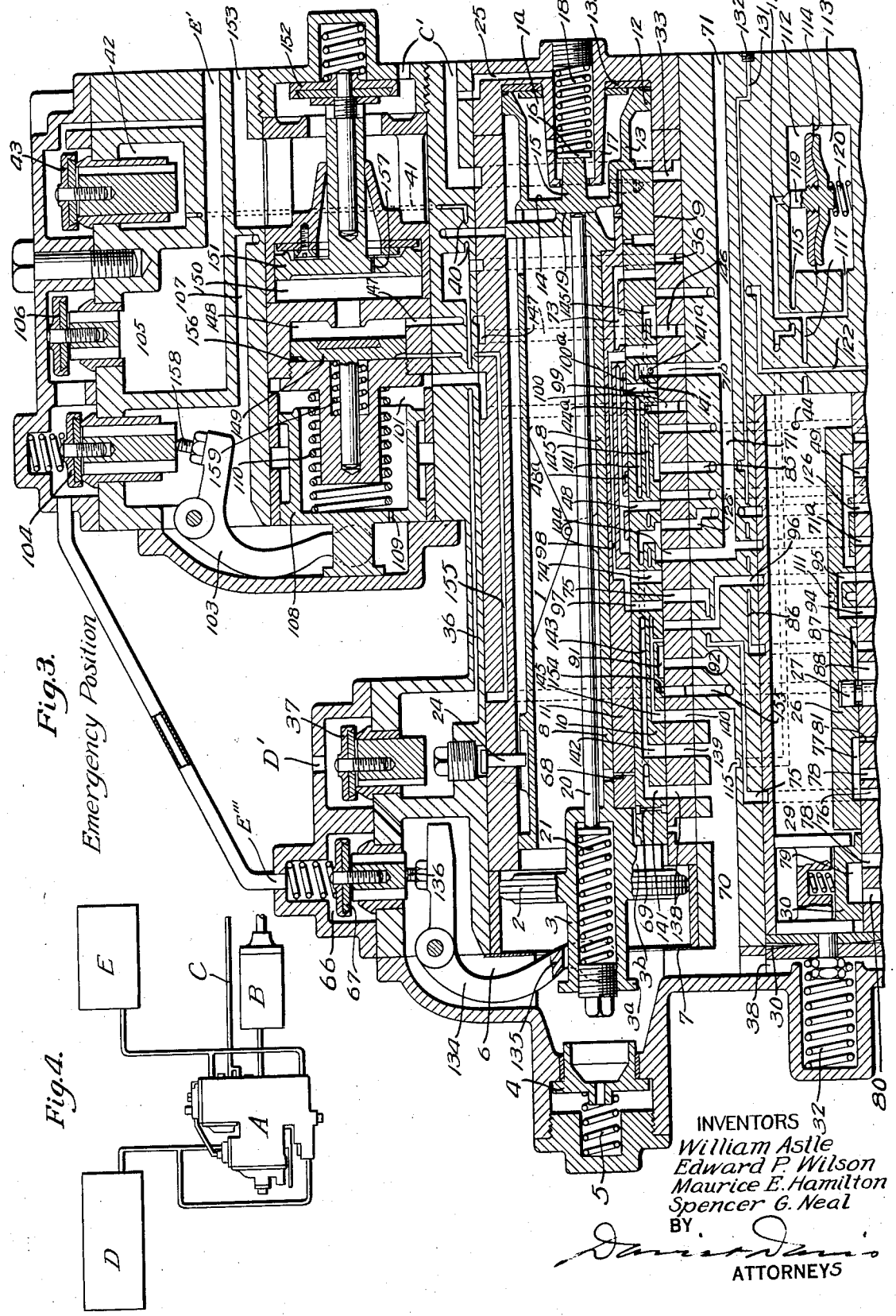

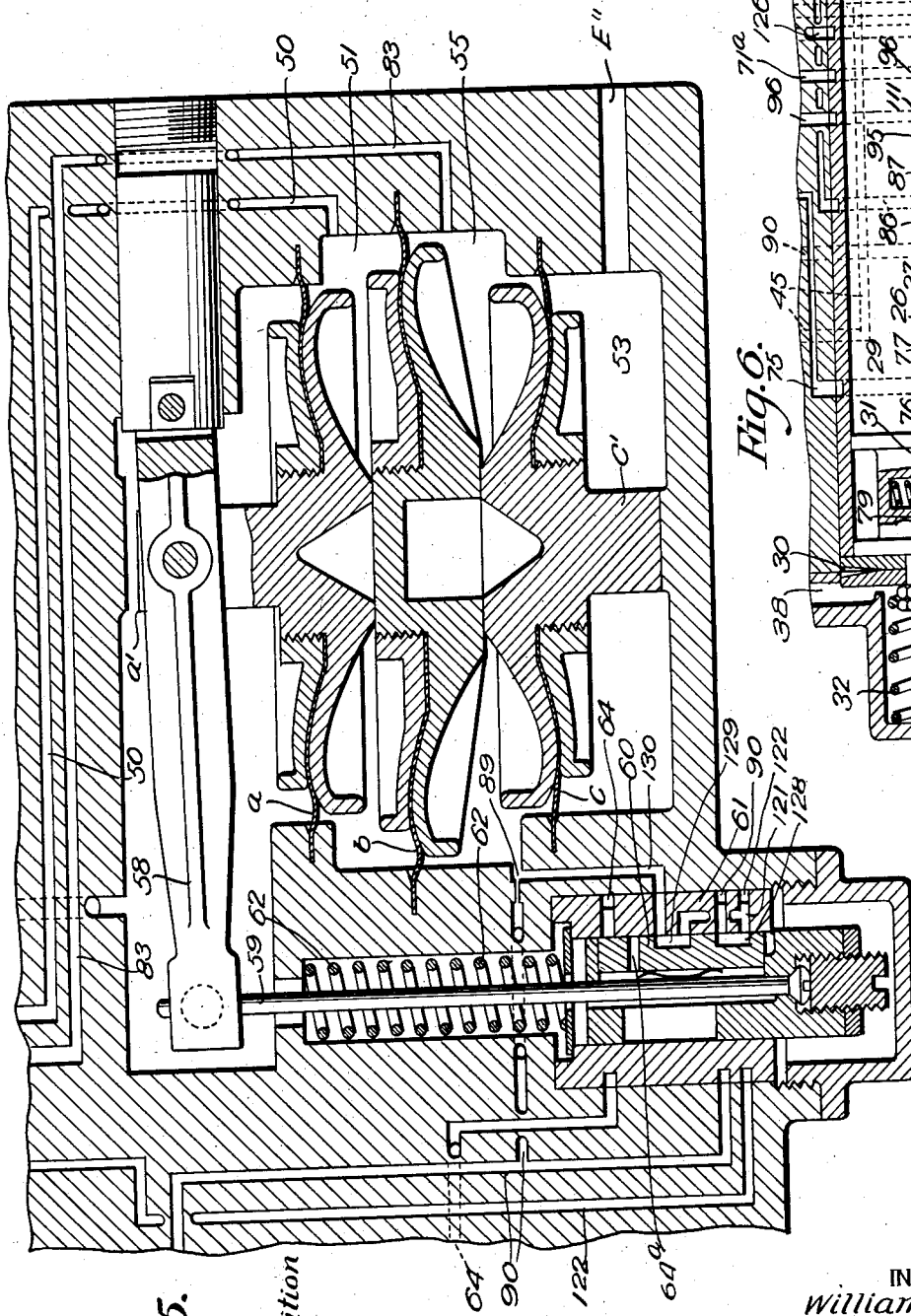
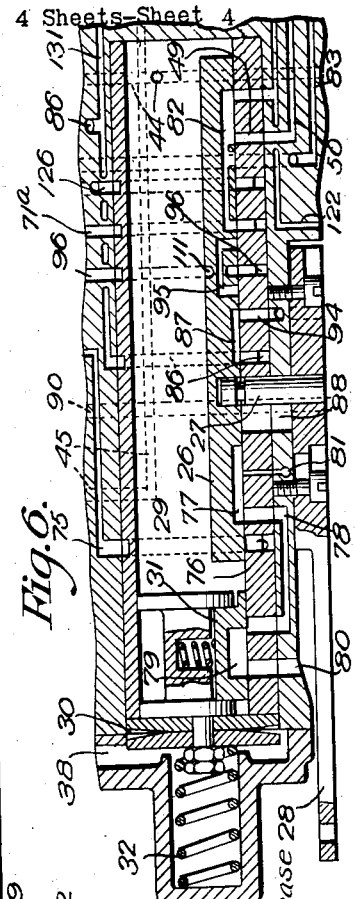

Patented Sept. 28, 1926.

1,601,586

UNITED STATES PATENT OFFICE.

WILLIAM ASTLE, OF BROOKLYN, NEW YORK, EDWARD P. WILSON, OF EAST ORANGE, NEW JERSEY, MAURICE E. HAMILTON, OF PAWTUCKET, RHODE ISLAND, AND SPENCER G. NEAL, OF NEW YORK, N. Y., ASSIGNORS TO AUTOMATIC STRAIGHT AIR BRAKE COMPANY, OF WILMINGTON, DELAWARE, A CORPORATION OF DELAWARE.

FLUID-PRESSURE-BRAKE CONTROL VALVE.

Application filed November 10, 1925. Serial No. 68,151.

This invention provides a control valve by means of which the operations of, charging the system with air under pressure; service braking application; release after a service application; emergency application; regulating brake cylinder pressure, and governing the rate of release of brake cylinder pressure, are performed.

A control valve constructed in accordance with this invention comprises, first, a function-determining valve device; second, a service braking pressure regulating and maintaining valve; third, an automatic valve for governing the rate of brake cylinder exhaust; and fourth, a manually operable release governing valve. The function-determining valve device comprises a main slide valve, and a supplemental slide valve co-operating therewith. These two valves are superposed and the main slide valve remains stationary during the charging operation, service braking operations and in release after service applications. The supplemental slide valve moves to service application position and back to release position, the main slide valve remaining stationary during these movements. The supplemental slide valve remains in service position until it is moved back to release position. It has no service lap position. The main slide valve moves to emergency position and then back to normal release position. The main slide valve has no emergency lap position. It is moved back to normal full release position upon an equalization of pressures when releasing from an emergency application of the brakes. The main and supplemental slide valves co-operate in the charging operation and in all release operations.

The service braking pressure regulating and maintaining valve device co-operates with the main and supplemental slide valves in service position to connect the brake pipe and the service reservoir with the brake cylinder. When the desired brake cylinder pressure has been built up in the brake cylinder the pressure regulating valve will be moved to lap position thereby cutting off the flow of air to the brake cylinder. Should the brake cylinder pressure leak down the pressure regulating valve will be moved to service position and air will again flow to the brake cylinder until the required pressure has been again established in the brake cylinder.

The manually operable release governing valve has two positions, a quick release position and a graduated release position. In the quick release position it provides for a full quick release of the brake cylinder pressure and in its graduated release position it provides for a slow release of brake cylinder pressure. In both the quick release position and the graduated release position this release governing valve co-operates with the main and supplemental slide valves. In the graduated release position of the release governing valve, brake cylinder pressure will be released entirely through the brake cylinder pressure regulating valve, and the main slide valve. In the quick release position of the release governing valve, brake cylinder pressure will be released through the main and supplemental slide valves and through the release governing valve. The pressure regulating valve will go to release position and a small portion of the brake cylinder pressure will be released through the said valve, and the quick full release of brake cylinder pressure will take place through the main and supplemental slide valves and the release governing valve.

One of the objects of the invention is to provide a control valve which cannot move to an emergency position upon a service reduction of brake pipe pressure.

Another object of the invention is to provide means whereby an excessive brake pipe pressure during the release period will move the exhaust rate regulating valve device to restrict the brake cylinder exhaust. The purpose of this is to retard the release of the brakes on the forward end of the train during release and re-charging operations.

Another object of the invention is to provide means whereby when the control valve is in release position with the release governing valve in quick release position a predetermined portion of the emergency reservoir air will be discharged into the brake pipe for the purpose of quickly raising the brake pipe pressure and thereby securing a quick release of the brakes.

Another object of the invention is to provide means whereby the emergency reservoir and the service reservoir may be simultaneously charged upon a normal rise in brake pipe pressure, the emergency reservoir charging port being closed and an independent service reservoir charging port being opened by an excessive rise of brake pipe pressure. The purpose of this is to prevent an overcharge of the emergency reservoir. The simultaneous charging of the emergency reservoir and the service reservoir can take place only while there is an equalization of pressures in the brake pipe and the service reservoir, or substantially so, and the control valve will move back to emergency reservoir charging position when there is a substantial equalization of pressures in the brake pipe and in the service reservoir.

There are other important objects and advantages of the invention which will appear hereinafter.

In the drawings:

Fig. 1 is a diagrammatic sectional view of the control valve showing the parts in full release and charging position with the release governing valve in quick release position;

Fig. 2 a diagrammatic sectional view of the lower portion of the control valve showing the parts in service position with the release governing valve in quick release position;

Fig. 3 a diagrammatic sectional view of the upper portion of the control valve showing the parts in emergency position, with the release governing valve in quick release position;

Fig. 4 a diagrammatic view of the braking system;

Fig. 5 a diagrammatic sectional view of the brake cylinder pressure regulating and maintaining valve and its operating diaphragms;

Fig. 6 a diagrammatic sectional view of the release governing valve in graduated release position; and Fig. 7 a detail of the normal charging stop.

In order to simplify the description of the triple valve the various parts and the ports and passages will not be specifically described except in connection with the description of the various operations of the triple valve.

In the diagrammatic view, Fig. 4, A designates the control valve, B the brake cylinder, C the brake pipe, D the service reservoir and E the emergency reservoir.

The main function determining valve device comprises a main valve chamber 1. In this chamber is arranged the main actuating piston 2. The piston 2 separates the main valve chamber 1 from a service reservoir chamber 6. The brake pipe is directly connected to the main valve chamber and the service reservoir is directly connected to the chamber 6 so that brake pipe pressure is on the inner side of the piston 2 and service reservoir pressure is on the outer side of said piston. The piston 2 is formed with an outwardly extending tubular extension 3, the outer end of which is adapted to abut against a spring pressed normal charging stop 4, said stop being held in its normal position by a spring 5. Stop 4 is arranged to hold the piston 2 slightly inwardly from a stop wall 7 so that an excessive brake pipe pressure in chamber 1 will force the piston 2 outwardly against the tension of the spring 5 until said piston abuts against the rigid stop wall 7 of the valve casing. This slight excess movement of the piston under an excessive pressure in chamber 1 is for the purpose of cutting off the brake pipe port to the emergency reservoir and opening a small port leading only to the service reservoir. This operation will be more fully hereinafter described. The piston 2 is formed with an inwardly extending valve engaging portion 8, said inwardly extending portion also serving as a guide for the piston and the valve connected thereto. On the main valve seat 9 is arranged a main slide valve 10, and on top of said valve 10 is arranged a supplemental slide valve 11, this latter valve being connected to the piston 2 by the inwardly extending part 8. Valve 11 moves with the piston and slides on top of the main valve 10.

In the opposite end of the main valve chamber from the piston 2 is arranged a small service stop piston 12, said piston having an inwardly extending cup-shaped portion 13. The inner wall 14 of this cup-shaped portion is provided with a central outwardly extending stop lug 15 which normally bears against a washer 16 arranged in an inwardly projecting tubular extension 17 of the valve casing. In this tubular extension is arranged a service stop spring 18. The inner wall 19 of the extension 8 is adapted to engage the inner side of the wall 14, said wall 14 serving as a limiting stop for the supplemental slide valve when the piston 2 is moved inwardly upon a service reduction of brake pipe pressure. Mounted in the guide portion 8 is a central longitudinally extending service stop rod 20, one end of which extends into the tubular portion 3 of the main piston 2. Within said tubular portion, the rod 20 is formed with a head which is adapted to engage one end of a comparatively light spring 21. Said spring maintains the rod normally in position so that its free end projects slightly beyond the end wall 19 of the part 8. The end of the rod 20 is adapted to engage the wall 14 and to serve as a service stop for the supplemental valve. Should the brake pipe reduction be sufficient to permit the service reservoir air in chamber 6 to move the piston 2 slightly beyond its service application position, spring 21 will be compressed and the wall 19 will be brought into engagement with stop wall 14. This slight excess movement of the supplemental valve beyond service position will open a port to permit an equalization of pressures on opposite sides of the piston 2 to thereby prevent the valves going to emergency position.

The cup-shaped portion of the service stop piston 12 is connected directly to the main slide valve by a pin 22. The piston 12 is also formed with an inwardly extending guide portion 23, said guide portion being arranged to engage a fixed stop 24, said stop positively determining the inner position of the piston 12 and the normal position of the main slide valve. The main slide valve remains in its normal position during all operations of the main valve device except when it moves to emergency position, as will be hereinafter described. The piston 12 forms a small supplemental brake pipe chamber $1^a$ which is separated from the main valve chamber 1 by said piston. The supplemental chamber $1^a$ is connected directly to the brake pipe by passage 25.

The manually operable release governing valve consists of a slide valve 26 which is connected by a stem 27 to an operating rod 28. The stem 27 extends upwardly through an operating slot and the said slot serves as a means to limit the in-and-out sliding movement of the valve. To place the valve 26 in its quick release position the operating rod is pulled out, and to place it in its graduated release position the said rod 28 is shoved inwardly. The valve 26 is arranged in a valve chamber 29 and the outer end of this chamber is closed by an exhaust-rate-regulating diaphragm 30. Connected to this diaphragm is a small exhaust-rate-regulating valve 31. A spring 32 bears on the outer side of the diaphragm 30 and holds the valve 31 in its normal release position. The release governing valve chamber 29 is connected directly to the main valve chamber 1 so that brake pipe pressure will always be registered in said chamber. An excess brake pipe pressure in said chamber 29 will move the valve 31 into restricted release position.

*Release and charging.*

In charging the system brake pipe air flows through the brake pipe connection C', passage and port 33, into the brake pipe chamber 1 of the main control valve, forcing the main piston 2 toward the left until it is stopped by the normal charging stop 4. From the main control valve chamber air passes through port 34 of the valve 11, through port 35 in the main slide valve and passage 36, past check valve 37 to the service reservoir connection D', and also into chamber 6 on the service reservoir side of the piston 2. It also passes down into chamber 38 on the service reservoir side of the exhaust-rate-regulating valve diaphragm 30. From the passage 36 brake pipe air travels through passage 40 into a passage 41 which leads to the chamber 42, and then past check valve 43 to the emergency reservoir connection E'. Air also passes from the main valve chamber 1 through port $44^a$ in the main slide valve 10, port and passage 44 into the release governing valve chamber 29 and also down into an actuating chamber 46 above an actuating diaphragm $a$. The port $44^a$ leads through the side of the main slide valve and opens into the main valve chamber 1. In the full release position of the main slide valve, brake pipe air passes from chamber 1 through groove $48^a$ in the supplemental slide valve, through passage 48 of the main slide valve, passage 126, cavity 82 in the release governing valve, port 49, and passage 50 to brake cylinder chamber 51 of the diaphragm section. This is only in the quick release position of the release governing valve. In the graduated release position of the release governing valve, passage 126 is closed.

The brake cylinder chamber 51 is formed between the actuating diaphragm $a$ and the equalizing diaphragm $b$. This latter diaphragm is larger in area than the actuating diaphragm, for the purpose which will hereinafter appear. The emergency reservoir E is connected at E'' to the emergency chamber 53 below the emergency diaphragm $c$. Between the diaphragms $b$ and $c$ is formed a retention chamber 55, for purposes which will be hereinafter described. The emergency diaphragm carries a downwardly extending release stop $c'$ and the actuating diaphragm carries an upwardly extending application stop $a'$. These stops limit the movements of the diaphragms. In the actuating chamber is arranged a lever 58. One end of this lever is pivoted on a rigid post secured to the wall of the actuating chamber, the other end thereof being connected to a valve rod 59. Intermediate its ends the lever 58 is pivotally connected to the upwardly extending stop stem $a'$ so that the lever will be swung up-and-down by the up-and-down movements of the actuating diaphragm. On the lower end of the valve rod 59 is secured a brake cylinder pressure regulating and maintaining valve 60, said valve being held yieldingly to its seat 61. Surrounding the valve stem is a lap spring 62 which bears at its lower end upon the valve 60 and at its upper end against a suitable stop formed in the valve casing. When the actuating diaphragm is moved upwardly the valve 60 is pulled upwardly against the tension of the lap spring. When the desired pressure has been built up in the brake cylinder chamber 51 the pressure regulating valve will be moved downwardly to lap position by the excess pressure on the larger equalizing diaphragm b.

The lap spring will assist the pressure in the brake cylinder chamber 51 in moving the pressure regulating valve to lap position. When the valve is relieved of the spring pressure it will remain in lap position. When the pressure in the actuating chamber is raised for the purpose of securing a release of brake cylinder pressure the actuating diaphragm will be moved downwardly and the pressure-regulating valve will be moved down to release position. Upon a reduction of brake pipe pressure the pressure in the actuating chamber will be reduced and then the undisturbed emergency reservoir pressure in the emergency pressure chamber 53 will move all the diaphragms upwardly and carry the pressure regulating valve to application position. In this movement of the regulating valve spring 62 will be placed under compression.

The service reservoir D is connected at D'' to chamber 63. Chamber 63 is connected to the regulating valve seat by passage 64 and a check valve 65 is interposed between the chamber 63 and the passage 64 to prevent the flow of brake pipe air to chamber 63 through passage 64 in the charging operation. The emergency reservoir is connected at E''' to a chamber 66 and is held therein by the emergency reservoir check valve 67. In normal charging, the emergency reservoir and the service reservoir are charged at the same time. With an abnormal charging pressure in the brake pipe and in the main valve chamber 1 the valve 11 is moved sufficiently to cut off communication between port 34 and port 35. This stops the charging of the emergency reservoir so long as there is an excessive pressure in the brake pipe. The excessive pressure in chamber 1 moves the piston 2 against the tension of the charging stop spring 5 and the normal charging stop 4. The slight excess movement of the supplemental valve 11 brings a supplemental charging port 68 into register with a port 69 which connects with a large extension 70 of the service reservoir chamber 6 so that air may flow through said port 68 into the chamber 6 and thence into the service reservoir. When the service reservoir pressure and the pressure in the main valve chamber have equalized, or substantially so, the supplemental valve will be moved back to normal charging position and thereafter air will flow from the chamber 1 to both the emergency reservoir and the service reservoir.

In the quick release position of the release governing valve brake cylinder pressure will be released to atmosphere through passage 71, port 72 of the main slide valve, port and passage 73 of the supplemental slide valve, port 74 of the main slide valve, passage 75, port 76 in the seat of the release governing valve, cavity 77 in the release governing valve, port and passage 78 in the release governing valve seat, cavity 79 in the release regulating valve 31 and atmospheric port 80. Brake cylinder pressure will also flow from 77 to atmospheric port 81. This is a restricted port and when valve 31 is in closed position port 78 will be closed by valve 31 and brake cylinder pressure will then exhaust through port 81 alone. 80 will be cut off from 78. Valve 31 will be moved when there is excess brake pipe pressure in release governing valve chamber 29. With the release governing valve in quick release position brake pipe air will flow from the main valve chamber 1 through port 48, passage 126, a cavity 82 in the release governing valve, through port 49 and passage 50 to the brake cylinder pressure chamber 51 of the diaphragm section. This is for the purpose of equalizing the pressures on opposite sides of the actuating diaphragm to prevent any possibility of the valve 60 going to application position.

In the quick release position of the release governing valve pressure will flow from the retention chamber 55 of the diaphragm section through port and passage 83, cavity 84 in the main slide valve, passage 85, passage 86 to cavity 87 in the release governing valve and then to atmosphere through the operating slot 88 of the release governing valve. Pressure from chamber 55 will also blow down through the restricted port 89, passage 90, cavity 91 in the main slide valve, and atmospheric port 92.

With the release governing valve in graduated release position port 86 is cut off from the exhaust slot 88. In this position of the release governing valve the blow down from the retention chamber 55 will be through the restricted port 89 up to atmospheric port 92. In the graduated release position of the release governing valve communication between port 49 and port and passage 126 is closed so that brake pipe air will not be supplied to the brake cylinder pressure chamber 51 of the diaphragm section in graduated release operations.

In the quick release position of the release governing valve the quick release chamber 93 is connected by passage 94 with a port 95 in the release governing valve. Port 95 connects to port and passage 96 which leads to a port 97 in the main slide valve, this latter port being connected to a port and passage 98 in the supplemental slide valve. 98 is connected to a port 99 in the main slide valve and this port registers with a port and passage 100 which leads to the quick release piston chamber 101. Chamber 101 therefore will be vented to the quick release chamber 93 in the release position of the main and supplemental slide valves, when the release governing valve is in quick release position. When the chamber 101 is vented to chamber 93 which has previously been vented to atmosphere the pressure in chamber 102 will force the quick release piston inwardly against its spring and throw the lever 103 and open the quick release valve 104. When the quick release valve 104 is open emergency reservoir pressure will flow from chamber 105 past check valve 106 past valve 104 into chamber 102 and thence through passage 107 to the main valve chamber 1. From chamber 1 the emergency reservoir air will flow through the charging passage 33 to brake pipe. The quick release piston 108 is provided with a small leak port 109 so that the pressures on opposite sides are equalized and the piston will be moved to its normal position by its spring 110.

In the graduated release position of the release governing valve, passage and port 94 is connected to port 86 so that the volume of chamber 93 is added to the volume of chamber 55. Chamber 101 will then not be vented when the main slide valve goes to release position. Port 96 will be connected to the release governing valve chamber 29 through a port 111 in the release governing valve so that brake pipe air will be maintained in chamber 101 thereby preventing the operation of the quick release piston. In the service position of the supplemental slide valve chamber 93 is vented to atmosphere through the main exhaust port so that the air delivered into said chamber in the quick release operations will be vented to atmosphere when the supplemental valve is moved to service position.

*Service application.*

A service application of the brakes is brought about by a service reduction in brake pipe pressure in the usual manner. A service reduction of brake pipe pressure in chamber 1 will result in a movement of the piston 2 inwardly, or toward the right, as viewed in the drawings, because of the service reservoir pressure on the left hand face of the piston. The piston and the supplemental slide valve will move inwardly until the spring-pressed rod 20 contacts with the service stop 14, said service stop forming a part of the service stop piston 12. The service stop piston and the service stop are held in position by the spring 18. The piston 2 will move to service position on a reduction of brake pipe pressure in chamber 1. If there is a rapid pressure reduction the rod 20 will compress the spring 21 and permit the supplemental valve to have a slight excess movement. Spring 21 is lighter than spring 18 so that it will compress before the service abutment 14 is moved against the force of the spring 18. The slight excess movement of the supplemental valve will uncover port 69 and permit service reservoir air to flow into the main valve chamber 1 and balance with the pressure on the reservoir side of the piston 2. This will prevent the piston 2 moving to emergency position. When the pressures on opposite sides of the piston 2 have equalized, or substantially so, the spring 21 will move the supplemental valve back to normal service position and close port 69.

Automatic means are provided to connect the service reservoir to the brake pipe chambers of the triple valve whenever the brake pipe is reduced a predetermined amount below the service reservoir pressure. This means consists of a device containing a chamber 112 and a chamber 113. These chambers are separated by a diaphragm 114. The chamber 112 is connected by a passage 115 to the extension 70 of service reservoir chamber 6 so that service reservoir pressure is always in chamber 112. The brake pipe chamber 113 is connected by a passage 117 to the release governing valve chamber 29 in which there is always brake pipe pressure, except in emergency position. Passage 117 is connected by branch passage 118 to the chamber 112. Passage 118 is normally closed by a valve 119 which is held to its seat by a spring 120 arranged in the chamber 113. Spring 120 is tensioned to resist a three pound differential in pressure in chamber 112 over the pressure in chamber 113. When the brake pipe pressure in chamber 113 is reduced more than the predetermined amount below the service reservoir pressure in chamber 112 valve 119 will be moved from its seat and service reservoir air will flow through passage 118 into the release governing valve chamber and from said chamber through passage and port 44 to the main valve chamber and into the actuating chamber 46. It is therefore clear that this automatic device will prevent the brake pipe pressure being reduced more than the predetermined amount below the service reservoir pressure. This, of course, is upon a service reduction of brake pipe pressure. An emergency reduction of brake pipe pressure would be so fast and so great that this compensating device would not operate to prevent the emergency action of the main slide valve.

A service reduction of pressure in the actuating chamber 46 will result in an upward movement of the diaphragms $a$, $b$ and $c$, due to the emergency reservoir pressure in chamber 53. The upward movement of the diaphragms will move the valve lever 58 and the valve 60 upwardly. The upward movement of the valve 60 connects the service reservoir passage 64 to the chamber of the regulating valve 60 through a port $64^a$ in the valve, and this chamber is in direct and open communication with the actuating chamber 46. The upward movement of the valve 60 uncovers a brake cylinder port 121 and permits the brake pipe air and the service reservoir air to flow from the said valve chamber through passage 122 to port 123 in the main slide valve. Port 123 is in communication with cavity 73 of the supplemental valve 11 and said cavity is in communication with the brake cylinder port 72 of the main slide valve, said port being at this time in direct communication with the service brake cylinder port 71$^b$ and with the brake cylinder passage 71.

Brake cylinder pressure will flow from cavity 73 in the supplemental valve through port 48 of the main slide valve, a passage 126 leading to a cavity 82 in the release-governing valve, port 49, passage 50, into the brake cylinder pressure chamber 51 of the diaphragm structure. Brake cylinder pressure will be built up until the pressure in chamber 51 operating on the equalizing diaphragm $b$, plus the brake pipe pressure on the actuating diaphragm $a$, overcomes the emergency reservoir pressure in chamber 53. The pressure-regulating valve 60 will then go to lap position and shut off further flow of brake pipe and brake pipe reservoir air to the brake cylinder.

The equalizing diaphragm is properly proportioned with respect to the actuating diaphragm to secure the desired brake cylinder pressure for a given brake reduction. Usually these diaphragms are so proportioned as to bring about a two-and-one-half to one brake cylinder pressure ratio, that is to say, for a ten-pound brake pipe reduction a twenty-five pound brake cylinder pressure will be built up before the pressure regulating valve is moved to lap position.

The supplemental valve 11 will remain in service position. This valve has no service lap position. Should the brake cylinder pressure leak down, the pressure in the brake cylinder chamber 51 will be reduced and the emergency reservoir pressure will then move the pressure regulating and maintaining valve to service position and the brake cylinder pressure will be built up from the brake pipe and the brake pipe reservoir and will be maintained at the predetermined ratio to the brake pipe reduction.

The supplemental valve 11 is provided on its face with a small groove 100$^a$ which leads into the main valve chamber 1 and which, in the service position of the said supplemental valve, registers with the port 99 of the main slide valve and port and passage 100 in the seat of the main slide valve, said port and passage leading to the chamber 101. The purpose of this is to make certain that brake pipe pressure will be equalized on opposite sides of the quick release piston when the supplemental valve is in service position. Brake pipe pressure is always in chamber 102 and opposed to the brake pipe pressure in chamber 101.

With the release-governing valve in graduated-release position air will flow from passage 122 into the cavity of the release-governing valve and thence through passage 71$^a$ to the brake cylinder passage 71. The purpose of this is to permit the pressure regulating valve 60 in service position to deliver brake pipe and service reservoir air directly to the brake cylinder in advance of the movement of the supplemental valve to service position. The passage 71$^a$ also permits brake cylinder pressure to flow back through passage 122 when the pressure regulating and maintaining valve 60 is in release position.

*Release after service.*

For a release of brake cylinder pressure after a service application of brakes the brake pipe pressure is increased in the usual manner through the manipulation of the engineer's brake valve. The increase in brake pipe pressure is registered in chamber 1 and also in the actuating chamber 46. Piston 2 will be moved back to release position and the actuating diaphragm will be depressed moving the valve 60 down to release position. In the release position of the valve 60 the service reservoir passage and port 46 will be closed. The brake cylinder port 121 will be connected by a cavity 128 in the valve 60 to the release port and passage 90 which leads to a cavity 91 in the main slide valve and said cavity is connected to the atmospheric port 92. Brake cylinder port 121 will be connected to the retention chamber 55 through a cavity 129 in the regulating valve 60 and through passage 130 so that brake cylinder pressure will flow into said chamber. With the release governing valve in quick release position, air from the retention chamber will flow through passage 83, cavity 84 in the main slide valve, port 85, passage 86, cavity 87 of the release governing valve and to atmosphere through slot 88. With the release governing valve in graduated release position, port 86 will be cut off from slot 88 and there will be no flow of air from chamber 55 through passage 83. Air from chamber 55 will also slowly blow down through the restricted port 89, passage 90 and atmospheric port 92. In the graduated release position of the release governing valve, air from chamber 55 will escape only through the restricted port 89.

The blow-down port 89 is quite small so that the pressure in the chamber 55 will be retained at a diminishing rate slightly below the brake cylinder pressure. The pressure in chamber 55, that is the differential energy created on the larger controlling diaphragm $b$, opposes the brake cylinder pressure in chamber 51 and tends to move the valve 60 back to lap position. If, while there is pressure in the retention chamber 55, the brake pipe pressure is reduced in order to bring about another application of the brakes, or an increased application of the brakes, the valve 60 will again move to application position and air under pressure will again be delivered to the brake cylinder. It is to be noted that when the valve 60 again goes to service position the port 130 is closed, thereby preventing any further flow of pressure to the retention chamber 55. Port 89 remains open. The brake cylinder pressure must now be built up an additional amount to overcome the differential energy created on the controlling diaphragm $b$ by the pressure retained in chamber 55. Air will continue to flow into the brake cylinder until the pressure has been built up sufficiently to compensate for the loss of pressure in chamber 46 and also to overcome the pressure in chamber 53. This will result in a higher brake cylinder pressure than would have resulted ordinarily, or in the first instance, from the given brake pipe reduction. Should the engineman again increase his brake pipe pressure for a release, or a partial release, of brakes, the valve 60 will again connect the brake cylinder to the retention chamber 55 and to atmosphere. Should the engineman then again reduce the brake pipe pressure the brake cylinder pressure will be still further built up. This is what is known as "cycling" and is the ordinary and usual operation when running down a grade a train equipped with the standard Westinghouse freight brake. When the grade is heavy the cycling operations are frequent and the periods of application-and-holding, and release-and-re-charging are short, about thirty to sixty seconds, and this short cycling will result in building up a heavy brake cylinder pressure. Where the grade is low the cycling periods are longer, and the slow cycling will not build up as heavy a brake cylinder pressure as will the rapid cycling because the brake cylinder pressure will be released to a lower pressure and likewise the pressure in chamber 55. The amount of pressure retained in the retention chamber 55 will govern the build up of brake cylinder pressure during the cycling operations. It is manifest therefore that if the release-and-re-charging periods are brief as when braking on heavy grades, a greater pressure will be retained in the retention chamber 55 and consequently a greater brake cylinder pressure must be built up on the next service operation in order to overcome the retained pressure in chamber 55. When the brake cycles are less frequent, as when braking on light grades, the release-and-re-charging operations are long and the pressure in chamber 55 has a greater period of time during which it may blow down through the passage 89. The result of this is that the build-up of brake cylinder pressure on the next application-and-holding operation will not be so great because there will not be as high a pressure in chamber 55 as there would have been if the application-and-holding operation followed a short release-and-re-charging operation. It is also manifest that if the release-and-re-charging operation is continued for a considerable period the pressure in chamber 55 will blow down completely and then upon the next service application the brake cylinder pressure will be built up only in proportion to the differential area of the diaphragms for a given brake pipe reduction. When the valve 60 is in release position the entire brake cylinder pressure is free to blow down. When the said valve is in lap position any pressure in the retention chamber is free to blow down through the restricted port 89.

With the release governing valve in quick release position, the quick release piston chamber 101 will be vented to the quick release chamber 93 and the quick release piston will be operated inwardly and the quick release valve 104 will be opened, thereby permitting emergency reservoir air to flow to the brake pipe through the main valve chamber 1. When the pressure in the quick release chamber 93 has equalized with the emergency reservoir pressure in chamber 102, through the equalizing port 109, the quick release piston will be moved outwardly and quick release valve 104 will be closed. By varying the size of the chamber 93 the length of time during which the valve 104 will remain open may be varied. This time may also be varied by varying the size of the leak port 109.

The quick release lever 103 is provided with an adjustable screw 158 which is adapted to engage the quick release valve 104 and lift it from its seat. By properly adjusting the screw 158 the quick release lever can be rendered in-operative to lift the quick release valve. This will prevent the flow of emergency reservoir air to the brake pipe in release operations with the release governing valve in quick release position.

The passage 86 is connected to atmosphere through passage 131 and said passage is closed by a removable plug 132. By removing the plug 132 the retention chamber 55 is directly open to atmosphere at all times except in emergency, regardless of the position of the release governing valve. This renders the retention chamber ineffective and cuts out the additional brake cylinder pressure build-up in cycling operations.

The supplemental valve in service position connects port 97 of the main slide valve to port 74 of the main slide valve through an extension of the port 98. This places the chamber 93 in communication with the atmosphere through the quick release exhaust port 80.

In the graduated release position of the release governing valve, port 94 is connected to port 86 through the cavity 87 in the release governing valve. This connects the quick release chamber 93 to the retention chamber 55 and augments the volume of that chamber.

*Emergency.*

An emergency reduction in brake pipe pressure in the main valve chamber 1 results in a movement of the piston 2 inwardly to emergency position. The service stop piston 12 is moved over to the limit of its movement to emergency position and forms an air seal against gasket 133. In the service reservoir chamber 6 is pivoted an emergency lever 134. One arm of this lever is formed with a yoke 135 which fits around the extension 3 of the main piston 2. The other arm of the lever is provided with a contact screw 136 which is adapted to engage the lower end of the emergency valve 67, and lift it from its seat. The yoke 135 is adapted to be engaged by the flange 3$^a$ on the outer end of the tubular extension 3 of the piston 2 when said piston has nearly reached its final emergency position. The emergency lever is so proportioned that a slight movement of the yoke end thereof will be sufficient to unseat the valve 67. It is desirable to have as much clearance between the flange 3$^a$ and the yoke 135 as is possible in order to prevent the opening of valve 67 in all movements of the piston 2 except in a desired emergency application. The emergency valve 67 is opened and emergency reservoir air flows into service reservoir chamber 6 and into chamber 70. It also flows down into chamber 38 against the diaphragm 30. The abutment 3$^b$ on the piston 2 engages the main slide valve and moves it inwardly to emergency position. Brake pipe port 33 is closed by the main slide valve. Service reservoir charging port 35 is closed by the supplemental valve and the main slide valve. Emergency reservoir air and service reservoir air flow from chamber 70 through the ports 138, 139, and 140. From port 139 air will flow into port 142 in the main slide valve, passage 143 in the main slide valve to the emergency brake cylinder port 144. From port 138 air will flow into port and passage 141 of the main slide valve and through said passage 141 to the service brake cylinder port 71$^b$ and thence to the brake cylinder. Emergency air will also flow from passage 143 into port and passage 126 and thence into the cavity 82 of the release governing valve. Air will flow through passage 140 into port and passage 145 in the main slide valve and thence to port 146, passage 147 to a chamber 148 back of emergency valve 149. The pressure in chamber 148 will force valve 149 from its seat and permit the air to flow into chamber 150 back of emergency vent valve piston 151. The pressure will force said piston inwardly and unseat an emergency vent valve 152. When valve 152 is unseated the brake pipe will be opened to a large atmospheric port 153. When the main slide valve is in emergency position a small port 154 in the main slide valve will connect valve chamber 1 to passage 155 which leads to chamber 156 in front of valve 149 so that air will flow into said chamber 156. The length of time during which the valve 149 will remain open will depend upon the size or capacity of the port 154 so that by properly proportioning this port the time required to build up an equalizing pressure in chamber 156 may be nicely regulated. Pressure will build up in chamber 156 and when it has substantially equalized with the pressure in chamber 148, valve 149 will be seated by a spring 159. When the valve 149 has seated, pressure on opposite sides of the vent valve piston 151 will be equalized through the leak port 157 whereupon the brake pipe vent valve 152 will be seated by its spring. When the brake pipe vent valve 152 is open, air from chamber 1$^a$ will be vented to atmosphere. Chamber 156 and the connected passages will be of the proper size and capacity to ensure the valve 149 being held open the desired length of time. This time element may be varied by varying the volume of chamber 156.

Brake cylinder pressure will equalize in chambers 1, 6, 29, 46, 51, 55, 53 and 156. The flow of pressure to all of these chambers is controlled by the main slide valve and the pressure regulating valve 60.

In the main slide valve a small port 141$^a$ leads from port 141 into the main slide valve chamber 1. When the port 141 is in register with the service brake cylinder port, brake cylinder pressure will flow through port 141$^a$ into the chamber 1 and equalize therein. The service braking pressure regulating valve will move to service position upon an emergency reduction of brake pipe pressure. This valve in service position will connect the service reservoir to the chamber of valve 60 and to the actuating chamber 46 so that there will be an equalization of pressures in those chambers. From chamber 46 air will flow through the passage 44 into the release governing valve chamber 29. Brake cylinder pressure will also be built up in the brake cylinder chamber 51 of the diaphragm structure, air flowing into said chamber through ports and passages 143, 126, 82, 49 and 50. Pressure will also be built up in the retention chamber 55 through port 154 in the main slide valve and through passages 155 and 90, and through the small leak port 89.

In the full release position of the main slide valve, chambers 148 and 156 are vented to atmosphere through atmospheric port 92.

*Release after emergency.*

The increasing brake pipe pressure being registered in chamber 1ª overcomes the pressure in chamber 1 and moves piston 13 and valve 10 to the left opening port 33 so that brake pipe air registers in chamber 1. The increasing brake pipe pressure in chamber 1 forces piston 2 and valve 11 to the left thereby opening the brake cylinder exhaust passage and the charging port. Brake cylinder pressure is then released to atmosphere and the reservoirs are recharged as previously described.

What we claim is:

1. In a fluid pressure brake control valve, a main valve device comprising co-operating superposed relatively shiftable main and supplemental slide valves for establishing service and emergency applying conditions and brake releasing and reservoir charging conditions in the control valve, the main slide valve remaining stationary in service operations, and the supplemental slide valve shifting relatively to the main slide valve to establish service application release and reservoir charging conditions, and both of said valves shifting to establish an emergency application condition and release after emergency.

2. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir and brake pipe in communication with the brake cylinder through the main and supplemental slide valves when the said supplemental valve is in service position, and means whereby the brake cylinder pressure will move the said pressure regulating valve to lap position when the desired pressure has been built up in the brake cylinder.

3. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a valve device operating upon a reduction of brake pipe pressure to connect the brake pipe and a reservoir to the brake cylinder through the main and supplemental slide valves when the supplemental valve is in service position, and means to move said valve device to lap position when the desired pressure is in the brake cylinder and while maintaining the supplemental slide valve in service position.

4. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a reservoir pressure to the other side of said piston whereby a reduction of brake pipe pressure in the valve chamber will result in an inward movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve will place a reservoir and the brake pipe in communication with the brake cylinder through the slide valve in the slide valve chamber when said valve is in service position, and means whereby the brake cylinder pressure will move the said pressure regulating valve to lap position when the desired pressure has been built up in the brake cylinder.

5. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a reservoir pressure to the other side of said piston whereby a reduction of brake pipe pressure in the valve chamber will result in an inward movement of the actuating piston and the connected slide valve to application position, means for arresting the said slide valve in service position, a valve device operating upon a reduction of brake pipe pressure to connect the brake pipe and a reservoir to the brake cylinder through the slide valve in the main slide valve chamber when the said slide valve is in service position, and means to move said valve device to lap position when the desired pressure is in the brake cylinder and while maintaining the said slide valve in service position.

6. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir and brake pipe in communication with the brake cylinder through the main and supplemental slide valves when the said supplemental valve is in service position, means whereby the brake cylinder pressure will move the said pressure regulating valve to lap position when the desired pressure has been built up in the brake cylinder, and means whereby an emergency reduction of brake pipe pressure will cause the actuating piston to move the main slide valve and the supplemental slide valve to emergency position, and means whereby said main slide valve in emergency position will connect an emergency reservoir to the brake cylinder.

7. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a valve device operating upon a reduction of brake pipe pressure to connect the brake pipe and a reservoir to the brake cylinder through the main and supplemental slide valves when the supplemental valve is in service position, means to move said valve device to lap position when the desired pressure is in the brake cylinder and while maintaining the supplemental slide valve in service position, means whereby an emergency reduction of brake pipe pressure will cause the actuating piston to move the main slide valve and the supplemental slide valve to emergency position, and means whereby said main slide valve in emergency position will connect an emergency reservoir to the brake cylinder.

8. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a reservoir pressure to the other side of the said piston whereby a reduction of brake pipe pressure in the valve chamber will result in an inward movement of the actuating piston and the connected slide valve to application position, means for arresting the said slide valve in service position, a service braking pressure regulating and maintaining valve device subject to brake pipe, brake cylinder and emergency reservoir pressures, said pressure regulating valve moving to service position upon a reduction of brake pipe pressure, and means whereby said pressure regulating valve will place a service reservoir and the brake pipe in communication with the brake cylinder through the slide valve in the main slide valve chamber when said slide valve is in service position, the brake cylinder pressure moving said pressure regulating valve to lap position when the desired pressure has been built up in the brake cylinder.

9. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device subject to brake pipe, brake cylinder and emergency reservoir pressures, said pressure regulating valve moving to service position upon a reduction of brake pipe pressure, and means whereby said pressure regulating valve will place a service reservoir and the brake pipe in communication with the brake cylinder through the slide valve in the main slide valve chamber when said slide valve is in service position, the brake cylinder pressure moving said pressure regulating valve to lap position when the desired pressure has been built up in the brake cylinder.

10. A fluid pressure brake control valve comprising a service braking pressure regulating and maintaining valve operating upon a service reduction of brake pipe pressure to connect a brake pipe and a service reservoir to the brake cylinder for a service application of the brakes, main and supplemental slide valves in a main slide valve chamber, the supplemental slide valve moving to service position upon a service reduction of brake pipe pressure, said valve in service position cooperating with the pressure regulating valve to admit air to the brake cylinder for a service application of the brakes, the main and supplemental slide valves responding to an emergency reduction of brake pipe pressure to place an emergency reservoir and a service reservoir in communication with the brake cylinder independently of the pressure regulating valve for an emergency application of the brakes.

11. A control valve in accordance with claim 10 combined with means whereby the main slide valve in emergency position closes communication between the brake pipe, the service reservoir and the emergency reservoir.

12. A fluid pressure brake control valve in accordance with claim 10 combined with means whereby the main and supplemental slide valves in release position operate means to connect the emergency reservoir to the brake pipe for a quick release of the brakes.

13. A fluid pressure brake control valve in accordance with claim 10 combined with means whereby the main and supplemental slide valves in release position operate means to connect the emergency reservoir to the brake pipe for a predetermined period for a quick release of the brakes.

14. A fluid pressure brake control valve in accordance with claim 10 combined with a release governing valve having a quick release position and a graduating release position, said valve in graduated release position preventing emergency reservoir air passing to the brake pipe when the main slide valve is in release position and in quick release position permitting the main slide valve and the supplemental slide valve to operate means to connect the emergency reservoir to the brake pipe and to connect the brake cylinder to an exhaust port through said release governing valve.

15. A fluid pressure brake control valve in accordance with claim 10 combined with a release governing valve having a quick release position and a graduated release position, said valve in graduated release position preventing emergency reservoir air passing to the brake pipe when the main slide valve and supplemental slide valve are in release position and in quick release position permitting the main slide valve and the supplemental slide valve to operate means to connect the emergency reservoir to the brake pipe for a predetermined period and to connect the brake cylinder to an exhaust port through said release governing valve.

16. A fluid pressure brake control valve comprising a service braking pressure regulating and maintaining valve subject to brake pipe, brake cylinder and emergency reservoir pressures and operating upon a reduction of brake pipe pressure to place the brake pipe and a service reservoir in communication with the brake cylinder for a service application of the brakes, the brake cylinder pressure assisting the brake pipe pressure in moving the said pressure regulating valve to lap position, main and supplemental slide valves in a main slide valve chamber and subject to brake pipe pressure and service reservoir pressure, the supplemental slide valve moving to service position upon a service reduction of brake pipe pressure, said valve in service position cooperating with the pressure regulating valve to admit air to the brake cylinder for a service application of the brakes, the main and supplemental slide valves being operated by service reservoir pressure to emergency position upon an emergency reduction of brake pipe pressure the said main valve in emergency position connecting an emergency reservoir and a service reservoir to the brake cylinder for an emergency application of the brakes.

17. A fluid pressure brake control valve in accordance with claim 16 and provided with means whereby the main slide valve in emergency position will cut off communication between the brake pipe and the service and emergency reservoirs.

18. A fluid pressure brake control valve in accordance with claim 16 and provided with means whereby the main slide valve and supplemental slide valve in full release position will connect the emergency reservoir to the brake pipe for a quick release of the brakes.

19. A fluid pressure brake control valve in accordance with claim 16 and provided with means whereby the main slide valve and the supplemental slide valve in full release position will connect the emergency reservoir to the main valve chamber and to the brake pipe for a quick release of the brakes.

20. A fluid pressure brake control valve in accordance with claim 16 and provided with means whereby the main slide valve and supplemental slide valve in full release position will connect the emergency reservoir to the brake pipe for a predetermined period for a quick release of the brakes.

21. A fluid pressure brake control valve in accordance with claim 16 and provided with a release governing valve having a graduated release position and a quick release position, said valve in its graduated release position rendering the main exhaust port of the main slide valve ineffective and preventing the flow of emergency reservoir air to the brake pipe whereby the release of brake cylinder pressure will be controlled by the pressure regulating valve, said release governing valve in its quick release position rendering the main slide valve effective in release operations and the supplemental slide valve in release position co-operating with the main slide valve to operate means to admit the emergency reservoir air into the brake pipe for a quick release of the brakes.

22. A fluid pressure brake control valve in accordance with claim 16 and provided with a release governing valve having a graduated release position and a quick release position, said valve in its graduated release position rendering the main exhaust port of the main slide valve ineffective and preventing the flow of emergency reservoir air to the brake pipe whereby the release of brake cylinder pressure will be controlled by the pressure regulating valve, said release governing valve in its quick release position rendering the main slide valve effective in release operations and the supplemental slide valve in release position co-operating with the main slide valve to operate means to admit the emergency reservoir air into the brake pipe for a predetermined period for a quick release of the brakes.

23. A fluid pressure brake control valve comprising a service braking pressure regulating and maintaining valve subject to brake pipe, brake cylinder and emergency reservoir pressures and operating upon a reduction of brake pipe pressure to place the brake pipe and a service reservoir in communication with the brake cylinder for a service application of the brakes, the brake cylinder pressure assisting the brake pipe pressure in moving the said pressure regulating valve to lap position, main and supplemental slide valves in a main slide valve chamber and subject to brake pipe pressure and service reservoir pressure, a brake pipe connection to the main slide valve chamber, the supplemental slide valve moving to service position upon a service reduction of brake pipe pressure, in the main slide valve chamber, said valve in service position co-operating with the pressure regulating valve to admit air to the brake cylinder for a service application of the brakes, the main and supplemental slide valves being operated by service reservoir pressure to emergency position upon an emergency reduction of brake pipe pressure in the main slide valve chamber, the said main valve in emergency position connecting an emergency reservoir and a service reservoir to the brake cylinder independently of the pressure regulating valve for an emergency application of the brakes.

24. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with a service braking pressure regulating and maintaining valve operating upon a slow reduction of brake pipe pressure to admit air to the brake cylinder for a service application of the brakes said pressure regulating valve operating upon an increase in brake pipe pressure to connect the brake cylinder to atmosphere, a main slide valve having a normal release and service application position and an emergency position, a supplemental slide valve co-operating with the main slide valve and movable to service position upon a service reduction of brake pipe pressure said supplemental valve in service position co-operating with the pressure regulating valve to admit air to the brake cylinder for a service application of the brakes, the main and supplemental slide valves operating upon an emergency reduction of brake pipe pressure to move to emergency position, the main slide valve in emergency position connecting the emergency reservoir to the brake cylinder, means whereby the main slide valve will be automatically moved back to normal release and service application position after an emergency application, and means whereby the supplemental slide valve will be moved to release position upon an increase of brake pipe pressure.

25. A fluid pressure brake control valve in accordance with claim 24 and provided with an emergency reservoir valve, a quick release valve, means operating to open said emergency reservoir valve when the main slide valve is moved to emergency position to thereby permit the emergency reservoir air to flow to the brake cylinder, and means whereby the main slide valve in normal position and the supplemental slide valve in release position will operate means to open the quick release valve to permit emergency reservoir to flow to the brake pipe for a quick release of the brakes.

26. A fluid pressure brake control valve in accordance with claim 24 and provided with a quick release valve, and means whereby the main slide valve in normal position and the supplemental slide valve in release position will operate means to open the quick release valve to permit emergency reservoir air to flow to the brake pipe for a predetermined period for a quick release of the brakes.

27. A fluid pressure brake control valve in accordance with claim 26 and provided with a release governing valve having a quick release position and a graduated release position said valve in graduated release position preventing the opening of the quick release valve when the main slide valve is in normal position and the supplemental slide valve is in release position.

28. A fluid pressure brake control valve in accordance with claim 24 and provided with a brake pipe vent valve and with means whereby when the main slide valve is in emergency position, the said vent valve will be opened and the brake pipe vented to atmosphere.

29. A fluid pressure brake control valve in accordance with claim 16 and provided with an emergency reservoir valve, a quick release valve, means operating to open said emergency reservoir valve when the main slide valve is moved to emergency position to thereby permit the emergency reservoir air to flow to the brake cylinder, and means whereby the main slide valve in normal position and the supplemental slide valve in release position will operate means to open the quick release valve to permit emergency reservoir air to flow to the brake pipe for a quick release of the brakes.

30. A fluid pressure brake control valve in accordance with claim 16 and provided with a quick release valve, and means whereby the main slide valve in normal position and the supplemental slide valve in release position will operate means to open the quick release valve to permit emergency reservoir air to flow to the brake pipe for a predetermined period for a quick release of the brakes.

31. A fluid pressure brake control valve in accordance with claim 30 and provided with a release governing valve having a quick release position and a graduated release position said valve in graduated release position preventing the opening of the quick release valve when the main slide valve is in normal position and the supplemental slide valve is in release position.

32. A fluid pressure brake control valve in accordance with claim 16 and provided with a brake pipe vent valve and with means whereby when the main slide valve is in emergency position, the said vent valve will be opened and the brake pipe vented to atmosphere.

33. A fluid pressure brake control valve operating upon a reduction of brake pipe pressure to admit air to a brake cylinder for an application of the brakes and operating upon an increase in brake pipe pressure to connect the brake cylinder to atmosphere and comprising a service braking pressure regulating and maintaining valve subject to brake pipe, brake cylinder and emergency reservoir pressures and operating upon a reduction of brake pipe pressure to connect the brake pipe and a service reservoir to the brake cylinder for a service application of the brakes and operating upon an increase in brake pipe pressure to connect brake cylinder to atmosphere, main and supplemental slide valves, a piston operatively connected thereto, the supplemental slide valve moving to service position upon a service reduction in brake pipe pressure and when in service position co-operating with the pressure regulating valve to admit air to the brake cylinder for a service application of the brakes, the main and supplemental slide valve being operated to emergency position by an emergency reduction of brake pipe pressure to connect the emergency reservoir to the brake cylinder for an emergency application of the brakes, means to automatically return the main slide valve to normal position after an emergency application of the brakes, and means whereby an increase in brake pipe pressure will move the supplemental slide valve to release position.

34. A fluid pressure brake control valve in accordance with claim 33 and provided with an emergency reservoir valve, a quick release valve, means operating to open said emergency reservoir valve when the main slide valve is moved to emergency position to thereby permit the emergency reservoir air to flow to the brake cylinder, and means whereby the main slide valve in normal position and the supplemental slide valve in release position will operate means to open the quick release valve to permit emergency reservoir air to flow to the brake pipe for a quick release of the brakes.

35. A fluid pressure brake control valve in accordance with claim 33 and provided with a quick release valve, and means whereby the main slide valve in normal position and the supplemental slide valve in release position will operate means to open the quick release valve to permit emergency reservoir air to flow to the brake pipe for a predetermined period for a quick release of the brakes.

36. A fluid pressure brake control valve in accordance with claim 35 and provided with a release governing valve having a quick release position and a graduated release position said valve in graduated release position preventing the opening of the quick release valve when the main slide valve is in normal position and the supplemental slide valve is in release position.

37. A fluid pressure brake control valve in accordance with claim 33 and provided with a brake pipe vent valve and with means whereby when the main slide valve is in emergency position, the said vent valve will be opened and the brake pipe vented to atmosphere.

38. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release governing valve having a graduated release position and a quick release position, a service braking pressure regulating and maintaining valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder through the release governing valve, a retention chamber between the equalizing diaphragm and the emergency diaphragm and an emergency reservoir chamber in communication with the emergency reservoir, a service braking pressure control valve operatively connected to said diaphragms and in its application position admitting air to the brake cylinder and to the said brake cylinder pressure chamber through the release governing valve and in its release position admitting brake cylinder pressure into the said retention chamber and in its lap position closing said communication, and means to permit the pressure in the retention chamber to slowly blow down to atmosphere without regard to the position of the said pressure regulating valve.

39. A fluid pressure brake control valve in accordance with claim 38 and provided with means whereby the release governing valve in its quick release position will open a large exhaust port from the retention chamber to prevent the build up of pressure in said chamber when the said pressure regulating valve is in release position.

40. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir and brake pipe in communication with the brake cylinder through the main and supplemental slide valves when the said supplemental valve is in service position, means whereby the brake cylinder pressure will move the said pressure regulating valve to lap position when the desired pressure has been built up in the brake cylinder, means whereby an increase in brake pipe pressure will move the said pressure regulating valve in release position, and means whereby said valve in release position will admit brake cylinder pressure to oppose the brake cylinder pressure which moves said valve to lap position.

41. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir and brake pipe in communication with the brake cylinder through the main and supplemental slide valves when the said supplemental valve is in service position, means whereby the brake cylinder pressure will move the said pressure regulating valve to lap position when the desired pressure has been built up in the brake cylinder, and means whereby rapidly repeated increases and decreases in brake pipe pressure will operate the said pressure regulating valve to build up the brake cylinder pressure.

42. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir and brake pipe in communication with the brake cylinder through the main and supplemental slide valves when the said supplemental valve is in service position, means whereby the brake cylinder pressure will move the said pressure regulating valve to lap position when the desired pressure has been built up in the brake cylinder, means whereby rapidly repeated increases and decreases in brake pipe pressure will operate the said pressure regulating valve to build up the brake cylinder pressure, and a manually operable release governing valve having a graduated release position and a quick release position, said valve in its quick release position preventing the said build-up of brake cylinder pressure and in its graduated release position permitting the said build-up of said brake cylinder pressure.

43. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a yieldable service stop carried by the supplemental slide valve to permit the said supplemental valve to have a slight excess movement beyond service position upon a rapid service reduction of brake pipe pressure in the main valve chamber, and means whereby said slight excess movement of the supplemental valve beyond service position will permit service reservoir pressure to equalize into the main valve chamber to thereby prevent the movement of the main slide valve to emergency position.

44. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, a spring-pressed service stop piston connected to the main slide valve and holding said valve in its normal release and service position, and means whereby the said service stop piston will stop the supplemental slide valve in service position, the said service stop being movable upon an emergency reduction of brake pipe pressure to permit the main and supplemental slide valves to be moved to emergency position.

45. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a yieldable normal charging stop adapted to hold the supplemental slide valve in normal charging position and adapted to be moved by an excessive brake pipe pressure in the main valve chamber to permit the supplemental slide valve to move beyond its normal charging position, the supplemental slide valve being formed with two charging ports, one of which is operative in the normal charging position of said valve and the other of which is operative when said valve is moved beyond the normal charging position by excessive brake pipe pressure in the main valve chamber.

46. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston, whereby a reduction of brake pipe pressure in the main valve chamber will result in an inward movement of the actuating piston and the supplemental slide valve to application position, a spring-pressed service stop piston connected to the main slide valve and holding said valve in its normal release and service position, means whereby the said service stop piston will stop the supplemental slide valve in service position, the said service stop being movable upon an emergency reduction of brake pipe pressure to permit the main and supplemental slide valves to be moved to emergency position, an independent exhaust control valve, and means whereby an excessive brake pipe pressure will move said exhaust control valve to restrict the exhaust from the brake cylinder.

47. A fluid pressure brake control valve in accordance with claim 2 combined with an exhaust control valve, and means whereby an excessive brake pipe pressure will move said exhaust control valve to restrict the exhaust from the brake cylinder.

48. A fluid pressure brake control valve in accordance with claim 15 and provided with an exhaust control valve co-operating with the exhaust ports through the release governing valve, and means whereby an excessive brake pipe pressure will move said exhaust control valve to restrict the exhaust through the ports of the release governing valve.

49. A fluid pressure brake control valve in accordance with claim 10 combined with means whereby the main and supplemental slide valves in release position operate means to open a quick release valve to thereby connect the emergency reservoir to the brake pipe for a quick release of the brakes.

50. A fluid pressure brake control valve in accordance with claim 10 combined with a quick release valve controlling communication between the emergency reservoir and the brake pipe, a quick release piston operatively connected to said quick release valve and subject on opposite sides to brake pipe pressure, a quick release chamber, means whereby the main and supplemental slide valves in release position will exhaust the brake pipe pressure from one side of the said quick release piston to said quick release chamber to permit brake pipe pressure on the opposite side thereof to move it to open the quick release valve, means to permit the pressures on opposite sides of said quick release piston to slowly equalize, and means to move said piston to close the quick release valve when said pressures have equalized.

51. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with a release governing valve having a graduated release position and a quick release position, said valve in its quick release position providing a full free exhaust of brake cylinder pressure and in its graduated release position closing said full and free exhaust, a quick release valve controlling communication between the emergency reservoir and the brake pipe, means whereby an increase in brake pipe pressure for a release of the brakes will open said quick release valve to permit emergency reservoir air to flow to the brake pipe, means for automatically closing said quick release valve after a predetermined interval, and means whereby the release governing valve in its graduated release position will prevent the opening of the quick release valve, said release governing valve in its quick release position permitting the opening of said quick release valve.

52. A fluid pressure brake control valve operating upon a slow reduction of brake pipe pressure to admit air to the brake cylinder for a service application of the brakes and operating upon a sudden reduction of brake pipe pressure to admit emergency air to the brake cylinder for an emergency application of the brakes and operating upon an increase in brake pipe pressure to connect the brake cylinder to atmosphere, and provided with a release governing valve having a graduated release position and a quick release position, said valve in its quick release position providing a full free exhaust of brake cylinder pressure and in its graduated release position closing said full and free exhaust, a quick release valve controlling communication between the emergency reservoir and the brake pipe, a quick release piston operatively connected to said quick release valve and subject on opposite sides to brake pipe pressure, a quick release chamber, means whereby an increase in brake pipe pressure will exhaust brake pipe pressure from one side of said quick release piston to said quick release chamber to permit brake pipe pressure on the opposite side thereof to move it to open the quick release valve, means to permit the pressures on opposite sides of said quick release piston to slowly equalize, means to move said piston to close the quick release valve when said pressures have equalized, means for venting the quick release chamber to atmosphere upon movement of the supplemental slide valve to service position, and means whereby the release governing valve in its graduated release position will prevent the opening of the quick release valve, said release governing valve in its quick release position permitting the opening of said quick release valve.

53. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, an automatically operating valve means subject to brake pipe and service reservoir pressures and operated by service reservoir pressure when the brake pipe pressure has been reduced a predetermined amount below the service reservoir pressure to open communication between the service reservoir and the main valve chamber, whereby the brake pipe pressure in the main valve chamber will not be reduced more than a predetermined amount below service pressure during a service reduction of brake pipe pressure.

54. A fluid pressure brake control valve operating upon a slow reduction of brake pipe pressure to admit service reservoir air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, an automatically operating valve means subject to brake pipe and service reservoir pressures and operated by service reservoir pressure when the brake pipe pressure has been reduced a predetermined amount below the service reservoir pressure to open communication between the service reservoir and the brake pipe, whereby the brake pipe pressure will not be reduced more than a predetermind amount below the service reservoir pressure during a service reduction of brake pipe pressure.

55. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with an emergency vent valve controlling communication between the brake pipe and atmosphere, an emergency vent valve piston, an emergency valve controlling a port leading to the emergency vent valve piston chamber, means operating upon an emergency reduction of brake pipe pressure to admit emergency reservoir air to the emergency valve to open said valve whereby the emergency vent valve piston will be moved by emergency reservoir air to open the emergency vent valve, means whereby equalized emergency reservoir and brake cylinder pressure will equalize on opposite sides of the emergency valve to permit said valve to close, and means whereby the air in the emergency vent valve piston chamber will leak to atmosphere to permit the emergency vent valve to close.

56. A fluid pressure brake control valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere, and provided with an emergency vent valve controlling communication between the brake pipe and atmosphere, an emergency vent valve piston, an emergency valve controlling a port leading to the emergency vent valve piston chamber, means operating upon an emergency reduction of brake pipe pressure to admit emergency reservoir air to the emergency valve to open said valve whereby the emergency vent valve piston will be moved by emergency reservoir air to open the emergency vent valve, means whereby the pressures on opposite sides of the emergency valve will equalize, and means whereby air in the emergency vent valve piston chamber will leak to atmosphere when the emergency valve is closed.

57. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir in communication with the brake cylinder, and means whereby the brake cylinder pressure will move the said pressure regulating valve to lap position when the desired pressure has been built up in the brake cylinder.

58. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a valve device operating upon a reduction of brake pipe pressure to connect a reservoir to the brake cylinder, and means to move said valve device to lap position when the desired pressure is in the brake cylinder and while maintaining the supplemental slide valve in service position.

59. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device, means for moving said pressure regulating valve to service position upon a reduction of brake pipe pressure, means whereby said pressure regulating valve will place a service reservoir in communication with the brake cylinder, means whereby the brake cylinder pressure will move the said pressure regulating valve to lap position when the desired pressure has been built up in the brake cylinder, and means whereby an emergency reduction of brake pipe pressure will cause the actuating piston to move the main slide valve and the supplemental slide valve to emergency position, and means whereby said main slide valve in emergency position will connect an emergency reservoir to the brake cylinder.

60. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a valve device operating upon a reduction of brake pipe pressure to connect a reservoir to the brake cylinder, means to move said valve device to lap position when the desired pressure is in the brake cylinder and while maintaining the supplemental slide valve in service position, means whereby an emergency reduction of brake pipe pressure will cause the actuating piston to move the main slide valve and the supplemental slide valve to emergency position, and means whereby said main slide valve in emergency position will connect an emergency reservoir to the brake cylinder.

61. A fluid pressure brake control valve comprising a slide valve chamber, a slide valve therein, an actuating piston connected to said slide valve, a brake pipe connection with the main slide valve chamber whereby brake pipe pressure will be applied to the valve chamber side of the actuating piston, means for applying a reservoir pressure to the other side of the said piston whereby a reduction of brake pipe pressure in the valve chamber will result in an inward movement of the actuating piston and the connected slide valve to application position, means for arresting the said slide valve in service position, a service braking pressure regulating and maintaining valve device subject to brake pipe, brake cylinder and emergency reservoir pressures, said pressure regulating valve moving to service position upon a reduction of brake pipe pressure, and means whereby said pressure regulating valve will place a service reservoir in communication with the brake cylinder through the slide valve in the main slide valve chamber when said slide valve is in service position, the brake cylinder pressure moving said pressure regulating valve to lap position when the desired pressure has been built up in the brake cylinder.

62. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a service braking pressure regulating and maintaining valve device subject to brake pipe, brake cylinder and emergency reservoir pressures, said pressure regulating valve moving to service position upon a reduction of brake pipe pressure, and means whereby said pressure regulating valve will place a service reservoir in communication with the brake cylinder through the slide valve in the main slide valve chamber when said slide valve is in service position, the brake cylinder pressure moving said pressure regulating valve to lap position when the desired pressure has been built up in the brake cylinder.

63. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release governing valve having a graduated release position and a quick release position, a service braking pressure regulating and maintaining valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm and an emergency reservoir chamber in communication with the emergency reservoir, a service braking pressure control valve operatively connected to said diaphragms and in its application position admitting air to the brake cylinder and to the said brake cylinder pressure chamber through the release governing valve and in its release position admitting brake cylinder pressure into the said retention chamber and in its lap position closing said communication, and means to permit the pressure in the retention chamber to slowly blow down to atmosphere without regard to the position of the said pressure regulating valve.

64. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, a yieldable service stop carried by the supplemental slide valve to permit the said supplemental valve to have a slight excess movement beyond service position upon a quick service reduction of brake pipe pressure in the main valve chamber, and means whereby said slight excess movement of the supplemental valve beyond service position will permit service reservoir pressure to equalize into the main valve chamber to thereby prevent the movement of the main slide valve to emergency position.

65. A fluid pressure brake control valve comprising a slide valve chamber, a slide valve therein, an actuating piston connected to the slide valve, a brake pipe connection with the main slide valve chamber, whereby brake pipe pressure will be applied to the inner side of the actuating piston, means for applying service reservoir pressure to the outer side of said piston whereby a reduction of brake pipe pressure in the slide valve chamber will result in an inward movement of the actuating piston and the slide valve to application position, a service braking pressure regulating and maintaining valve device, means for moving said pressure regulating valve to service position upon a reduction of brake pipe pressure, means whereby said pressure regulating valve will place a source of braking pressure in communication with the brake cylinder through the slide valve when the said slide valve is in service position, and means whereby the brake cylinder pressure will move the said pressure regulating valve to lap position when the desired pressure has been built up in the brake cylinder.

66. A fluid pressure brake control valve comprising a main slide valve chamber, a main slide valve therein, a supplemental slide valve superposed on the main slide valve, a main actuating piston connected to the supplemental slide valve, a brake pipe connection whereby brake pipe pressure will be applied to one side of the main actuating piston, means for applying a reservoir pressure to the other side of said piston whereby a reduction of brake pipe pressure will result in a movement of the actuating piston and the supplemental slide valve to application position, means for holding the main slide valve stationary during the service movement of the supplemental slide valve, a valve device operating upon a reduction of brake pipe pressure to connect a source of braking pressure to the brake cylinder through the main and supplemental slide valves when the supplemental valve is in service position, and means to move said valve device to lap position when the desired pressure is in the brake cylinder and while maintaining the supplemental slide valve in service position.

67. A fluid pressure brake control valve comprising a slide valve chamber, a slide valve therein, an actuating piston connected to said slide valve, a brake pipe connection whereby brake pipe pressure will be applied to one side of the actuating piston, means for applying a reservoir pressure to the other side of said piston whereby a reduction of brake pipe pressure will result in a movement of the actuating piston and the connected slide valve to application position, means for arresting the said slide valve in service position, a service braking pressure regulating and maintaining valve device, means for moving the said pressure regulating valve to service position upon a reduction of brake pipe pressure, means whereby said pressure regulating valve in service position will place a source of braking pressure in communication with the brake cylinder through the slide valve in the slide valve chamber when said valve is in service position, and means whereby the brake cylinder pressure will move the said pressure regulating valve to lap position when the desired pressure has been built up in the brake cylinder.

68. A fluid pressure brake control valve comprising a slide valve chamber, a slide valve therein, an actuating piston connected to said slide valve, a brake pipe connection whereby brake pipe pressure will be applied to one side of the actuating piston, means for applying a reservoir pressure to the other side of said piston whereby a reduction of brake pipe pressure will result in a movement of the actuating piston and the connected slide valve to application piston, means for arresting the said slide valve in service position, a service braking pressure regulating and maintaining valve device subject to brake pipe, brake cylinder and emergency reservoir pressures, whereby the said pressure regulating valve will be moved to service position upon a reduction of brake pipe pressure, means whereby said pressure regulating valve in service position will place a source of braking pressure in communication with the brake cylinder through the slide valve in the slide valve chamber when said valve is in application position, and means whereby the brake cylinder pressure will move the said pressure regulating valve to lap position when the desired pressure has been built up in the brake cylinder.

69. A fluid pressure brake control valve comprising a slide valve chamber, a slide valve therein, an actuating piston connected to said slide valve, a brake pipe connection whereby brake pipe pressure will be applied to one side of the actuating piston, means for applying a reservoir pressure to the other side of said piston whereby a reduction of brake pipe pressure will result in a movement of the actuating piston and the connected slide valve to application position, means for arresting the said slide valve in service position, a valve device operating upon a reduction of brake pipe pressure to connect a reservoir to the brake cylinder through the slide valve in the main slide valve chamber when the said slide valve is in service position, and means to move said valve device to lap position when the desired pressure is in the brake cylinder and while maintaining the said slide valve in service position.

70. A fluid pressure brake control valve comprising a service braking pressure regulating and maintaining valve operating upon a service reduction of brake pipe pressure to connect a source of braking pressure to the brake cylinder for a service application of the brakes, main and supplemental slide valves in a main slide valve chamber, the supplemental slide valve moving to service position upon a service reduction of brake pipe pressure said valve in service position co-operating with the pressure regulating valve to admit air to the brake cylinder for a service application of the brakes, the main and supplemental slide valves responding to an emergency reduction of brake pipe pressure to place an emergency reservoir in communication with the brake cylinder independently of the pressure regulating valve for an emergency application of the brakes.

71. A fluid pressure brake control valve in accordance with claim 70 combined with means whereby the main and supplemental slide valves in release position operate means to connect the emergency reservoir to the brake pipe for a predetermined period for a quick release of the brakes.

72. A fluid pressure brake control valve in accordance with claim 70 combined with a release-governing valve having a quick-release position and a graduated-release position, said valve in graduated-release position preventing emergency reservoir air passing to the brake pipe when the main slide valve and supplemental slide valve are in release position and in quick-release position permitting the main slide valve and the supplemental slide valve to operate means to connect the emergency reservoir to the brake pipe for a predetermined period and to connect the brake cylinder to an exhaust port through said release-governing valve.

73. A fluid pressure brake control valve in accordance with claim 70 combined with an exhaust control valve, and means whereby an excessive brake pipe pressure will move said exhaust control valve to restrict the exhaust from the brake cylinder.

74. A fluid pressure brake control valve in accordance with claim 67 combined with an exhaust control valve, and means whereby an excessive brake pipe pressure will move said exhaust control valve to restrict the exhaust from the brake cylinder.

75. A fluid pressure brake control valve operating upon a reduction of brake pipe pressure to admit air to the brake cylinder for an application of the brakes and operating upon an increase in brake pipe pressure to connect the brake cylinder to atmosphere, and provided with a release-governing valve having a graduated-release position and a quick-release position, a service braking pressure-regulating and maintaining valve-operating means consisting of an actuating diaphragm, an equalizing diaphragm, an emergency diaphragm, an actuating chamber in communication with the brake pipe, a brake cylinder pressure chamber between the actuating diaphragm and the equalizing diaphragm and in communication with the brake cylinder, a retention chamber between the equalizing diaphragm and the emergency diaphragm and an emergency reservoir chamber in communication with the emergency reservoir, a service braking pressure control valve operatively connected to said diaphragms and in its application position admitting air to the brake cylinder and to the said brake cylinder pressure chamber and in its release position admitting brake cylinder pressure into the said retention chamber and in its lap position closing said communication, and means to permit the pressure in the retention chamber to slowly blow down to atmosphere without regard to the position of the said pressure regulating valve.

76. A fluid pressure brake control valve comprising a main slide valve chamber, a main slide valve therein, a supplemental slide valve superposed on the main slide valve, a main actuating piston connected to the supplemental slide valve, a brake pipe connection with the main slide valve chamber, whereby brake pipe pressure will be applied to the inner side of the main actuating piston, means for applying service reservoir pressure to the outer side of said piston whereby a reduction of brake pipe pressure in the main valve chamber will result in an inward movement of the actuating piston and the supplemental slide valve to application position, means for holding the main slide valve stationary during the service movement of the supplemental slide valve, a yieldable service stop carried by the supplemental slide valve, and means whereby said movement of the supplemental valve to application position will permit service reservoir pressure to flow into the main valve chamber.

77. A fluid pressure brake control valve comprising a main slide valve chamber, a main slide valve therein, a supplemental slide valve superposed on the main slide valve, a main actuating piston connected to the supplemental slide valve, a brake pipe connection whereby brake pipe pressure will be applied to one side of the main actuating piston, means for applying a reservoir pressure to the other side of said piston whereby a reduction of brake pipe pressure will result in a movement of the actuating piston and the supplemental slide valve to application position, means for holding the main slide valve stationary during the service movement of the supplemental slide valve, a yieldable service stop to permit the said supplemental valve to have a slight excess movement beyond service position upon a rapid service reduction of brake pipe pressure, and means whereby said slight excess movement of the supplemental valve will permit the reservoir pressure on the actuating piston to equalize with the reduced brake pipe pressure to thereby prevent the movement of the main slide valve to emergency position.

78. A fluid pressure brake control valve comprising a main slide valve chamber, a main slide valve therein, a supplemental slide valve superposed on the main slide valve, a main actuating piston connected to the supplemental slide valve, a brake pipe connection whereby brake pipe pressure will be applied to one side of the main actuating piston, means for applying a reservoir pressure to the other side of said piston whereby a reduction of brake pipe pressure will result in a movement of the actuating piston and the supplemental slide valve to application position, means for holding the main slide valve stationary during the service movement of the supplemental slide valve, a service stop, and means whereby said movement of the supplemental valve to application position will permit the reservoir pressure on the actuating piston to flow into the main valve chamber.

In testimony whereof we hereunto affix our signatures.

WILLIAM ASTLE.
EDWARD P. WILSON.
MAURICE E. HAMILTON.
SPENCER G. NEAL.